United States Patent [19]

Andoh et al.

[11] Patent Number: 4,823,191

[45] Date of Patent: Apr. 18, 1989

[54] IMAGE-SENSING APPARATUS

[75] Inventors: Junichi Andoh; Yukio Endo, both of Yokohama, Japan

[73] Assignee: Kabushiki Kaisha Toshiba, Kanagawa, Japan

[21] Appl. No.: 172,273

[22] Filed: Mar. 23, 1988

[30] Foreign Application Priority Data

Mar. 31, 1987 [JP] Japan ................................. 62-76169

[51] Int. Cl.$^4$ ............................................. H04N 3/14
[52] U.S. Cl. .................................. 358/213.31; 357/24
[58] Field of Search ....................... 358/213.31, 213.26, 358/213.19, 213.11; 357/24 LR, 30 G, 30 H

[56] References Cited

U.S. PATENT DOCUMENTS

| | | | |
|---|---|---|---|
| 4,419,696 | 12/1983 | Hamano et al. | 358/213.31 |
| 4,549,088 | 10/1985 | Ozawa | 358/213.31 |
| 4,626,915 | 12/1986 | Takatsu | 358/213.19 |
| 4,672,455 | 6/1987 | Miyatake | 358/213.31 |
| 4,682,236 | 7/1987 | Wang et al. | 358/213.31 |
| 4,688,098 | 8/1987 | Kon et al. | 358/213.31 |

OTHER PUBLICATIONS

Dickson, "On-Chip High-Voltage Generation in MNOS Integrated Circuits Using an Improved Voltage Multiplier Technique," IEEE Journal of Solid-State Circuits, vol. SC-11, No. 3, pp. 374–378, Jun. 1976.

Primary Examiner—Jin F. Ng
Assistant Examiner—Stephen Brinich
Attorney, Agent, or Firm—Finnegan, Henderson, Farabow, Garrett, & Dunner

[57] ABSTRACT

Image-sensing apparatus using solid-state image-sensing devices, including an improved high voltage generating circuit provided in order to transfer charges stored within the solid-state image-sensing devices. The improved high voltage generating circuit generates a high voltage by adding three pulse voltages with different phases. These pulse voltages are obtained by advantageously utilizing timing pulses prepared for driving the solid-state image-sensing devices.

9 Claims, 6 Drawing Sheets

IMAGE-SENSING APPARATUS

BACKGROUND OF THE INVENTION

This invention relates to an image-sensing apparatus using solid-state image-sensing devices, and more particularly to an image-sensing apparatus provided with an improved high voltage generating circuit for applying a bias voltage to the solid-state image-sensing devices.

In an image-sensing apparatus, an image-sensing device driving circuit, a signal processing circuit and a high voltage generating circuit are necessary. The driving circuit supplies timing pulses to solid-state image-sensing devices which, in turn, sense images, store charges introduced corresponding to the sensed images, and read such charges so as to produce electric signals. The signal processing circuit functions to receive and process the thus obtained signals so as to produce output signals. The high voltage generating circuit generates and supplies a bias voltage higher than the power source voltage of the apparatus to the solid-state image-sensing devices.

Specifically, in an image-sensing apparatus using solid-state image-sensing devices, the charge is transferred from a charge transferring section disposed on a semiconductor substrate, and stored within a floating diffusion region. The charge stored within the floating diffusion region is output from an output terminal as an output signal, however, in this case, a high DC bias voltage higher than the power source voltage is required. The high DC bias voltage is generated by a high voltage generating circuit, which is generally of a DC-to-DC converter. FIG. 9 shows an example of configuration of such the DC-to-DC converter.

In FIG. 9, a DC voltage from a DC power source 93 is converted into an AC voltage by the use of a switching circuit 92 which is controlled by an oscillator 91. The thus converted AC voltage is amplified by an amplifier 94. Thereafter, the amplified AC voltage is stepped up by a step-up transformer 95, and rectified by a rectifying circuit 96 back into a DC voltage. whereby a higher DC voltage can be obtained.

However, a high voltage generating circuit of this type has a complicated configuration. In addition, the larger in number of conversions, the more loss of power, so that the circuit consumes more electricity.

SUMMARY OF THE INVENTION

Accordingly, one object of the present invention is to provide an image-sensing apparatus using solid-state image-sensing devices provided with an improved high voltage generating circuit that generates a high DC bias voltage. Specifically, the high voltage generating circuit with a simplified configuration generates a high DC bias voltage by virtue of utilizing timing pulses that drive the solid-state image-sensing devices.

Briefly, in accordance with one aspect of the present invention, there is provided an image-sensing apparatus including solid-state image-sensing devices having photoelectric converter sections, circuits included in the solid-state image-sensing devices for reading signal charges stored within the photoelectric converter sections, a driving circuit for supplying timing pulses to the solid-state image-sensing devices, a pulse voltage generating circuit for generating multiple phase pulse voltages by utilizing the timing pulses produced from the driving circuit, and a high voltage generating circuit for adding pulse voltages received from the pulse voltage generating circuit so as to generate a high voltage and for supplying the generated high voltage to the circuits that read signal charges.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1b is a plan view illustrating a solid-state image-sensing device of the apparatus of FIG. 1a;

FIG. 1c is a wave-form chart illustrating output pulses of a driving circuit of the apparatus of FIG. 1a;

FIG. 3 is a diagram illustrating a high voltage generating circuit shown in FIG. 1a;

DESCRIPTION OF THE PREFERRED EMBODIMENTS

Figure 1A:
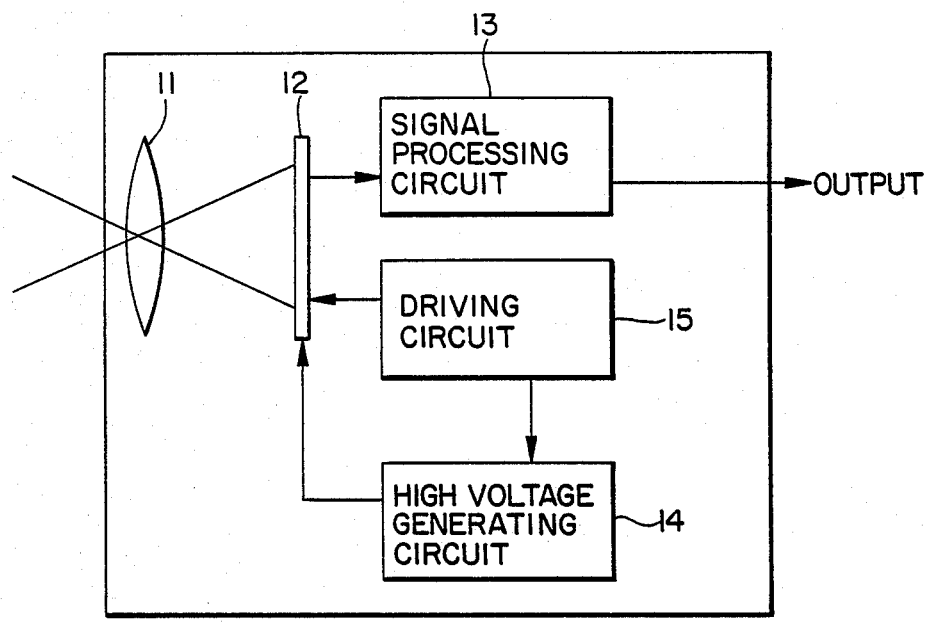
FIG. 1a is a diagram schematically illustrating an entire configuration of an image-sensing apparatus of one embodiment according to the present invention.

Referring now to the drawings, wherein like reference numerals designate identical or corresponding parts throughout the several views, one embodiment of the present invention will be described.

FIG. 1a schematically illustrates an entire configuration of image-sensing apparatus using solid-state image-sensing devices of one embodiment according to the present invention. In FIG. 1a, a solid-state image-sensing device 12 receives light from a scene through a lens 11. Signals produced from the solid-state image-sensing device 12 are fed into a signal-processing circuit 13. The signal-processing circuit 13 processes the received signals so as to produce output signals for use in forming a video signal. Circuit 13 is of conventional construction and will not be described in greater detail. In this embodiment, the power source voltage VDD of the image-sensing apparatus is 5 V, however, in order to take out charges stored within the solid-state image-sensing devices 12, a high DC bias voltage is required. To meet this, a high DC bias voltage of 15 V is generated within a high voltage generating circuit 14 and applied to the solid-state image-sensing devices 12.

Figure 1B:
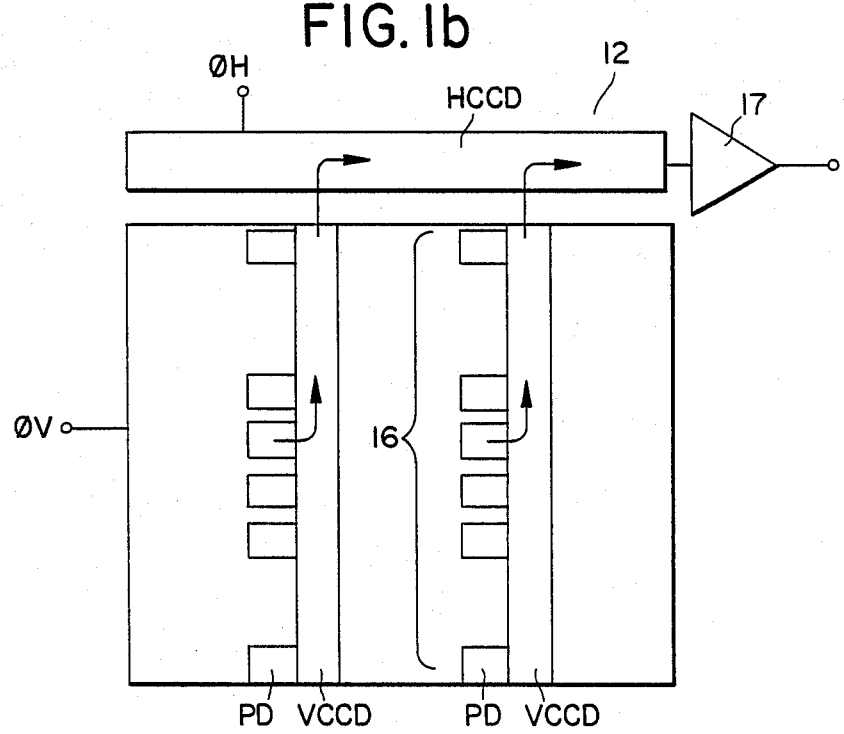

FIG. 1b is a plan view illustrating the solid-state image-sensing device 12 to be used in the apparatus shown in FIG. 1a. The device 12 is arranged on a single silicon substrate.

Light from a scene to be reproduced as an image is directed against device 12, causing signal charges to be generated and stored within photoelectric converter sections 16 (including photo diodes (PD)) incorporated in the solid-state image-sensing devices 12.

Figure 1C:
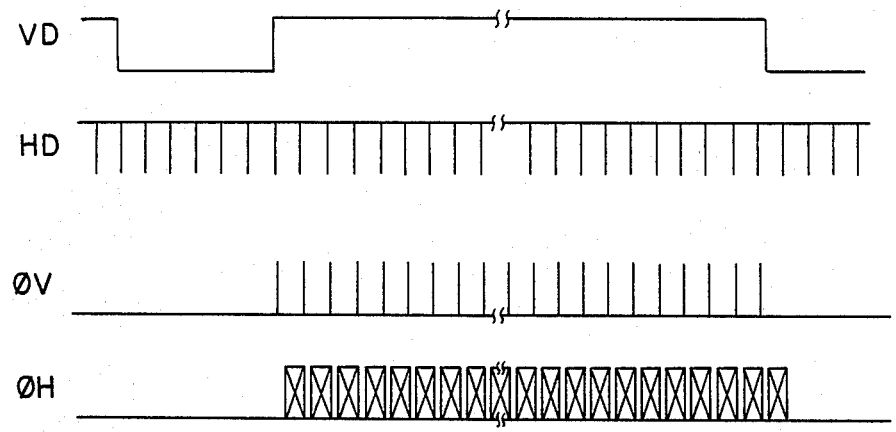

The invention includes means for reading signal charges stored within photoelectric converter sections 16. As embodied herein, the reading means includes vertical CCD and horizontal CCD. The stored signal charges are then transferred synchronously to vertical CCD disposed within regions adjacent to the sections 16 The signal charge transferred into the VCCD is transferred into the HCCD by a driven vertical transferring pulse ($\phi$V) derived from a horizontal synocronizing signal (HD), and then transferred in the HCCD with a two phase driven horizontal reading pulse ($\phi$H). This transfer is made every time the horizontal synchronizing signal (HD) enters. FIG. 1c is a waveform chart illustrating timing pulses produced from driving circuit 15 for driving the solid-state image-sensing device 12.

A group of signal charge in one horizontal transferring step is transferred within the HCCD in accordance with $\phi$H and is reset when it reaches the end of the HCCD. At the same time, the group of signal charges is output from an output amplifier 17 as a group of signals constituting one single scanning line of TV within one horizontal scanning period.

Figure 2:
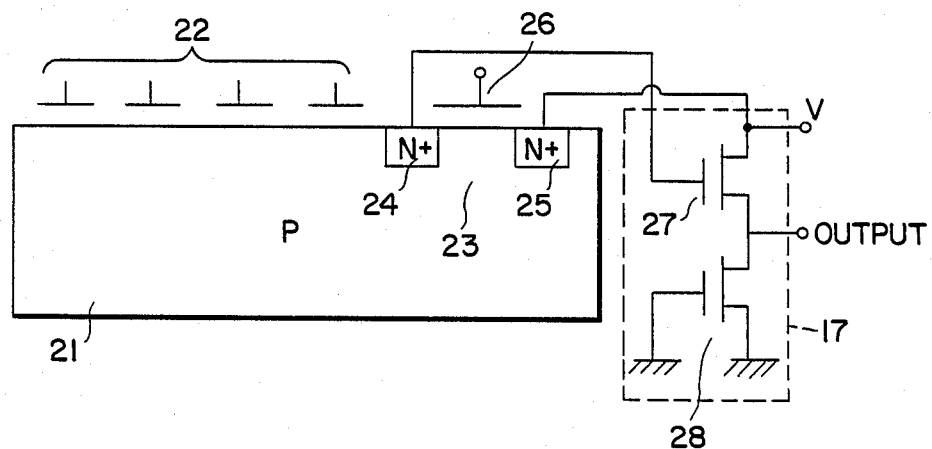
FIG. 2 is a diagram illustrating a configuration of the solid-state image-sensing device shown in FIG. 1b, including circuits that read signal charges.

FIG. 2 is a diagram illustrating a configuration of solid-state image-sensing device 12. In FIG. 2, on a p-type semiconductor substrate 21 charge transferring portions 22 and a switching portion 23 are formed. The switching portion 23 is constituted by a floating diffusion region 24 that stores charges from the charge transferring portions 22, a reset diffusion regions 25 and a reset gate electrode 26. The charges stored within the floating diffusion region 24 is output through amplifier 17, consisting of output transistors 27 and 28 at an output terminal (out). The power source voltage of the apparatus is usually 5 V, however, a DC bias voltage higher than the power source voltage of the apparatus is required in order to output charges stored within a deep potential well of the solid-state image-sensing devices. Thus, a DC bias voltage of 15 V is applied through a terminal (V) to the output transistor 27. The present invention is characterized in that the timing pulses produced from the driving circuit 15 are utilized as a source of the high voltage generating circuit 14. This advantage has realized a high voltage generating circuit with a significantly simplified configuration and less electricity consumption compared to a conventional high voltage generating circuit.

Figure 3:
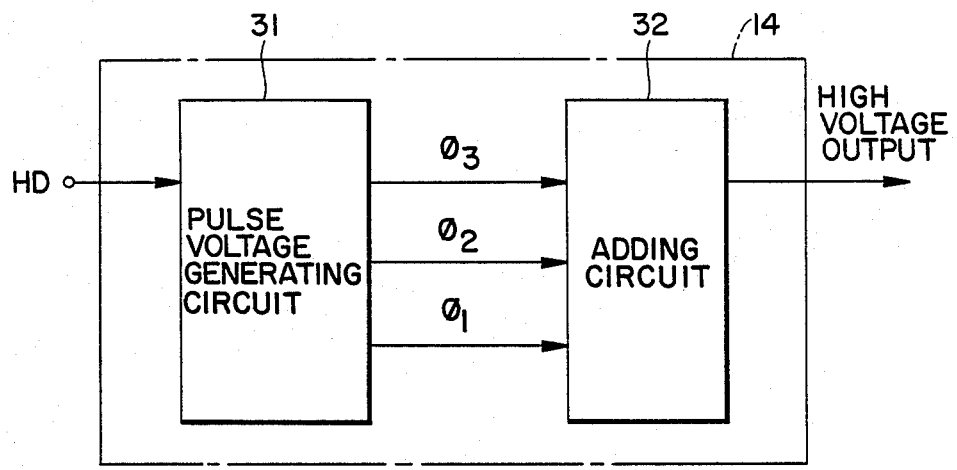

FIG. 3 is a block diagram of the high voltage generating circuit 14 shown in FIG. 1a. In FIG. 3, horizontal synchronizing signal HD, which is one of timing pulses (shown in FIG. 1c) produced from the driving circuit 15 is fed into a pulse voltage generating circuit 31. The pulse voltage generating circuit 31 utilizes the received horizontal synchronizing signal HD so as to output three pulse voltages $\phi_1$, $\phi_2$ $\phi_3$ with different phases each other.

The invention includes high voltage generating circuit means for adding pulse voltages received from the pulse voltage generating circuit so as to generate a high voltage and for supplying the generated high voltage to the means for reading signal charges. As embodied herein, the generating and supplying means comprises an adder circuit 32. The pulse voltages $\phi_1$, $\phi_2$ $\phi_3$ are fed into adding circuit 32, which, in turn, stores up the output amplitudes of these three pulse voltages so as to produce a specified high DC voltage of 15 V.

Figure 4:
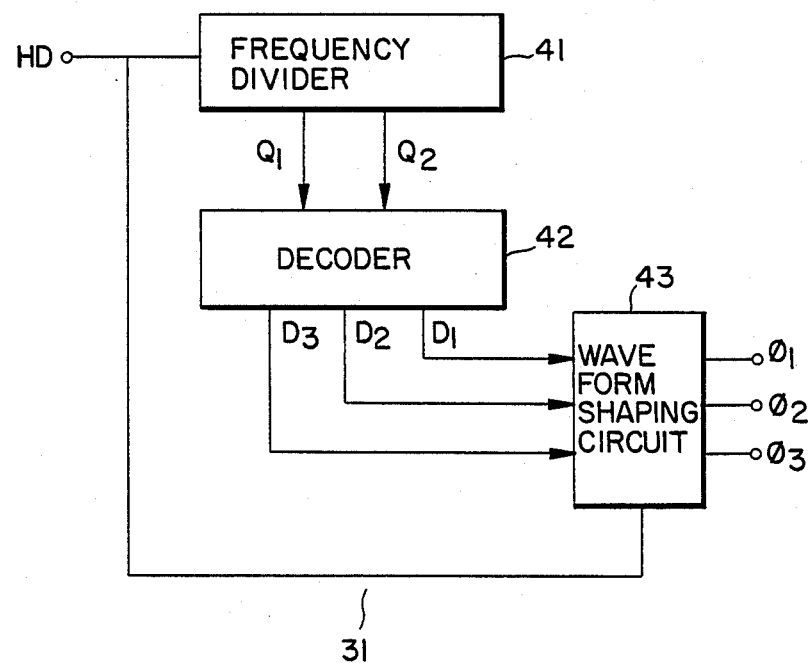
FIGS. 4 and 5 are diagrams illustrating specific configurations of a pulse voltage generating circuit shown in FIG. 3.
Figure 6:
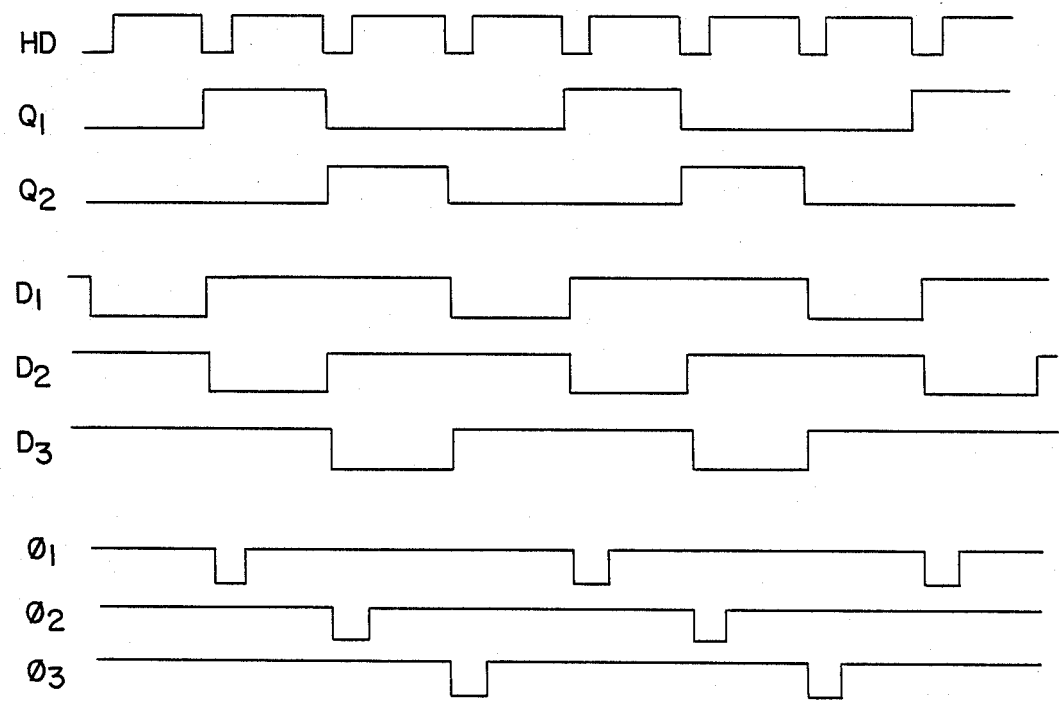
FIG. 6 is a wave-form chart for explaining the operations of the pulse voltage generating circuit shown in FIG. 4.

FIG. 4 shows one example of a pulse voltage generating circuit 31 used in the high voltage generating circuit 14. Signals involved in the operation of the pulse voltage generating circuit 31 are shown in Figure 6, which is a wave-form chart for explaining the operations of circuit 31. In Figure 4, horizontal synchronizing signal HD is fed into a ½—frequency divider 41, which, in turn, produces two output signals $Q_1$ and $Q_2$. The output signals $Q_1$ and $Q_2$ are decoded by a decoder circuit 42 such that three output signals $D_1$, $D_2$ and $D_3$ are obtained. The output signal $D_1$ becomes low when both the output signals $Q_1$ and $Q_2$ are low. The output signal $D_2$ becomes low when the output signal $Q_1$ is high and the output signal $Q_2$ is low. The output signal $D_3$ becomes low when the output signal $Q_1$ is low and the output signal $Q_2$ is high. Thereafter, the thus obtained decoder output signals $D_1$, $D_2$ and $D_3$ are fed into a wave-form-shaping circuit 43, which, in turn, shapes the wave forms of the received signals $D_1$, $D_2$ and $D_3$ so as to produce pulse voltages $\phi_1$, $\phi_2$ $\phi_3$ with different phases each other, as shown in FIG. 6. The circuit 43 also receives the horizontal synchronizing signal HD as a gate signal.

Figure 5:
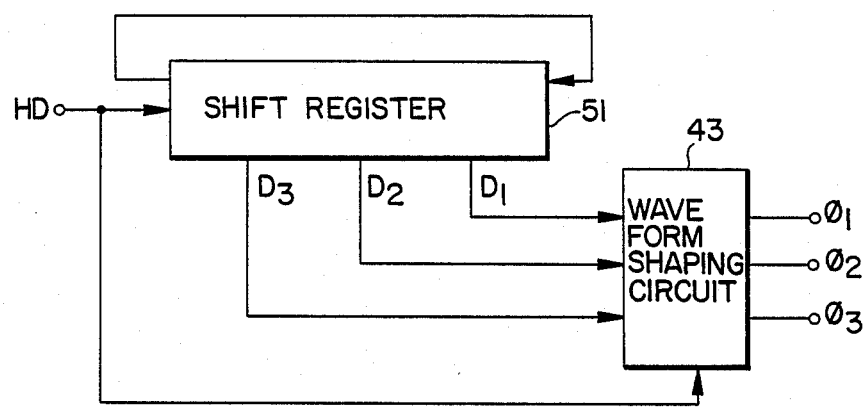

FIG. 5 shows another example of a configuration of pulse voltage generating circuit 31. In FIG. 5, a horizontal synchronizing signal HD is fed into a shift register 51, which, in turn, produces output signals $D_1$, $D_2$ and $D_3$. The thus obtained output signals $D_1$, $D_2$ and $D_3$ are similarly fed into wave-form-shaping circuit 43, which, in turn, shapes the received signals $D_1$, $D_2$ and $D_3$ so as to produce output pulse voltages $\phi_1$, $\phi_2$ $\phi_3$. As described above the high voltage generating circuit 14 with the simplified configuration can produce pulse voltages $\phi_1$, $\phi_2$ $\phi_3$ with different phases each other by utilizing the horizontal synchronizing signal which is one of the timing signals for use in driving the solid-state image-sensing devices 12.

Figure 7:
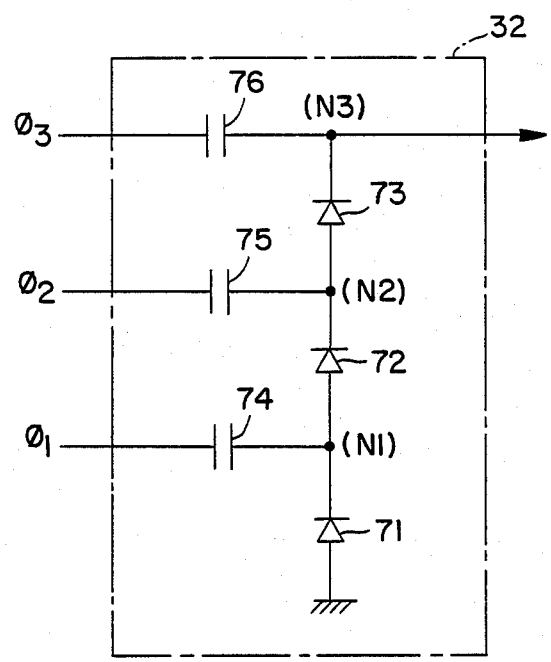
FIG. 7 is a diagram illustrating a specific configuration of an adding circuit shown in FIG. 3.

FIG. 7 shows more specifically a configuration of the adding circuit 32 shown in FIG. 3 for explaining one embodiment according to the present invention. In FIG. 7, the adding circuit 32 is constituted by diodes 71, 72 and 73 that are connected in series between an output terminal and a ground terminal (reference potential terminal), and capacitors 74, 75 and 76 that are respectively connected to the respective nodes $N_1$, $N_2$ and $N_3$ of the diodes 71, 72 and 73. The three-phase pulse voltages $\phi_1$, $\phi_2$ $\phi_3$ are respectively supplied through the capacitors 74, 75 and 76 to the nodes $N_1$, $N_2$ and $N_3$.

Figure 8:
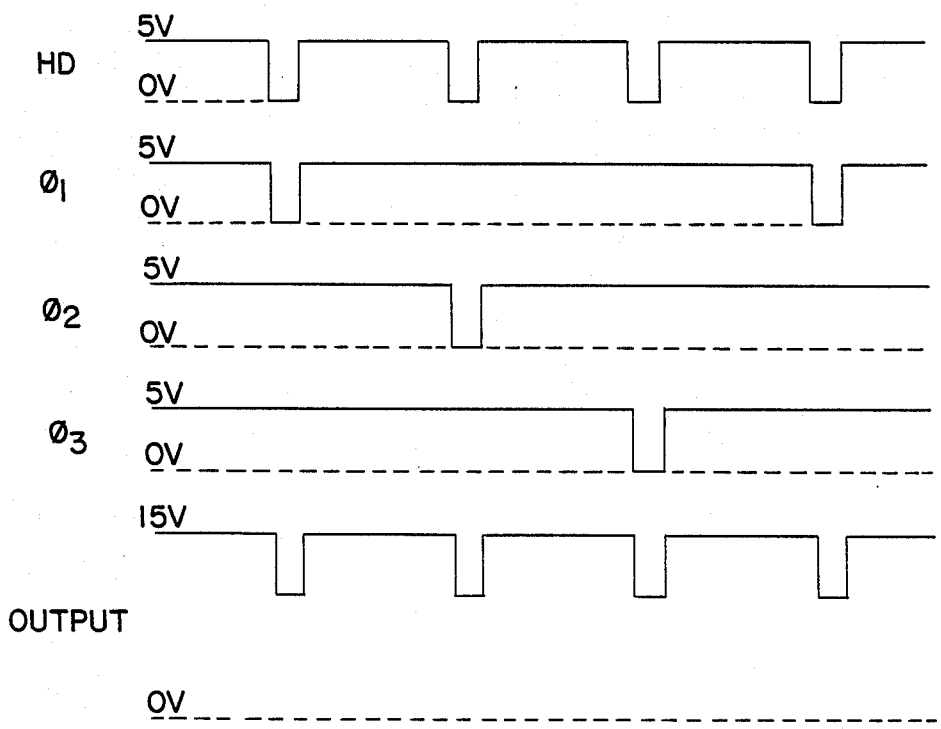
FIG. 8 is a wave-form chart for explaining the operations of the high voltage generating circuit shown in FIG. 3; and, FIG. 9 is a diagram illustrating a conventional high voltage generating circuit.
Figure 9:
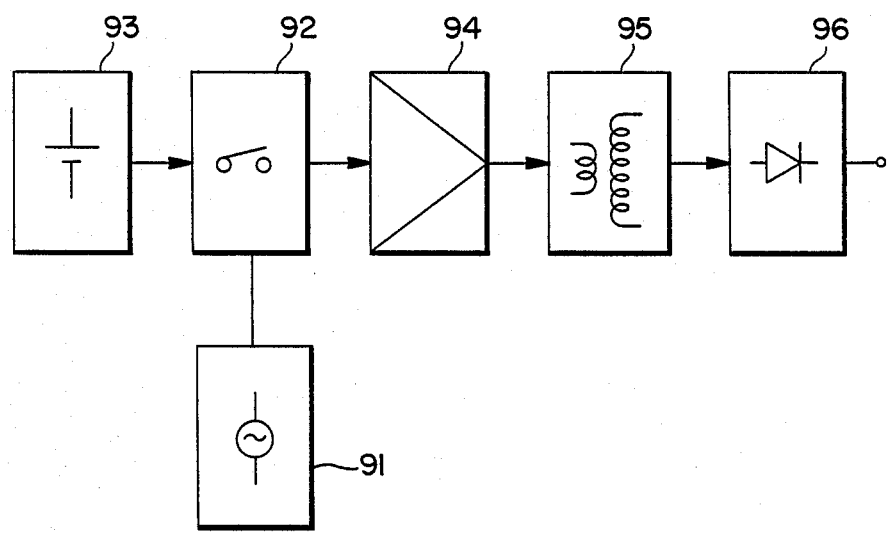

Next, the operations of the high voltage generating circuit 14 in the solid-state image-sensing apparatus with the above-described configuration will be described with reference to FIG. 8. In FIG. 8, three-phase pulse voltages $\phi_1$ through $\phi_3$ which are derived from the timing pulse, i.e., the horizontal synchronizing signal HD, are voltages with amplitudes of 5 V (power source voltage) that repeatedly become 0 V then 5 V at the different times one after another. When the three-phase pulse voltages $\phi_1$, through $\phi_3$ are fed into the adding circuit 32 shown in FIG. 7, the addition of the amplitudes thereof is performed as follows. Here, it is assumed that the capacitance of the capacitors 74 through 76 is much greater than the stray capacitance of the diodes 71 through 73. Also for convenience of explanation, the forward voltage drop of diodes 71 through 73 is assumed to be 0 V.

First, when the pulse voltage $\phi_1$ becomes 0 V, the potential of node $N_1$ becomes 0 V. When the pulse voltage $\phi_1$ becomes 5 V, the potential of node $N_1$ becomes 5 V. Next, when the pulse voltage $\phi_2$ becomes 0 V, the potential of $N_1$ of 5 V is charged through the diode 72 to the capacitor 75 so that the potential of node $N_2$ becomes 5 V. Next, when the pulse voltage $\phi_2$ returns to 5 V, the potential of node $N_2$ raised to 10 V. Next, when the pulse voltage $\phi_3$ becomes 0 V, the potential of $N_2$ of 10 V is charged through the diode 73 to the capacitor 76. Thus, when the pulse voltage $\phi_3$ returns to 5 V, the potential of node $N_3$ is raised to 5 V. Consequently, as shown in FIG. 8, at the node $N_3$, i.e., an output terminal, a high voltage of 15 V derived from the addition of the amplitudes of the pulse voltages $\phi_3$ through $\phi_3$ can be obtained.

In accordance with this embodiment, the configuration of the high voltage generating circuit becomes significantly simplified as compared to a conventional high voltage generating circuit using a DC-to-DC converter. Further, the high voltage generating circuit according to the present invention has less power loss in its circuit configuration, so that the electricity consumption of the solid-state image-sensing apparatus can be significantly reduced.

Hereinbefore, the description has been made such that the solid-state image-sensing devices 12 and the high voltage generating circuit 14 are separately disposed, however, they may be formed on one single semiconductor substrate.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An image-sensing apparatus comprising:
   solid-state image-sensing devices having photoelectric converter sections;
   means included in said solid-state image-sensing devices for reading signal charges stored within said photoelectric converter sections;
   a driving circuit for supplying timing pulses to said solid-state image-sensing devices;
   a pulse voltage generating circuit for generating multiple phase pulse voltages by utilizing said timing pulses produced from said driving circuit; and
   high voltage generating circuit means for adding pulse voltages received from said pulse voltage generating circuit so as to generate a high voltage and for supplying the generated high voltage to said means for reading signal charges.

2. The image-sensing apparatus according to claim 1, wherein said timing pulses comprise horizontal synchronizing signals for controlling said solid-state image-sensing devices.

3. The image-sensing apparatus according to claim 1, wherein said pulse voltage generating circuit includes a frequency divider, a decoder connected to the output of said frequency divider for processing output signals produced from said frequency divider, and a wave-form shaping circuit connected to the output of said decoder for shaping the wave form of output signals produced from said decoder.

4. The image-sensing apparatus according to claim 1, wherein said pulse voltage generating circuit includes a shift register and a wave-form shaping circuit connected to the output of the shift register for shaping the wave form of output signals produced from said shift register to produce multiple phase pulse voltages.

5. The image-sensing apparatus according to claim 3, wherein said frequency divider is a ½—frequency divider.

6. The image-sensing apparatus according to claim 1, wherein said high voltage generating circuit includes a plurality of diodes connected in series between a reference potential terminal and an output terminal, and a plurality of capacitors connected between said pulse voltage generating circuit and said diodes to supply said multiple phase pulse voltages to said high voltage generating circuit.

7. The image-sensing apparatus according to claim 6, wherein said diodes and capacitors are respectively identical to each other in respective ratings.

8. The image-sensing apparatus according to claim 1, wherein said multiple phase pulse voltages are all identical in voltage.

9. The image-sensing apparatus according to claim 8, wherein said multiple phase pulse voltages have amplitudes equal to the power source voltage of the apparatus.

* * * * *